(12) United States Patent
Maggert et al.

(10) Patent No.: US 11,075,425 B2
(45) Date of Patent: Jul. 27, 2021

(54) BATTERY PACK WITH CHARGER INTERFACE

(71) Applicant: MOTOROLA SOLUTIONS, INC., Chicago, IL (US)

(72) Inventors: Kevin K Maggert, Dacula, GA (US); Timothy Brand, Loganville, GA (US); James E Dempsey, Boynton Beach, FL (US); William B Kiger, Flowery Branch, GA (US); Mark C Taraboulos, Dunwoody, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 76 days.

(21) Appl. No.: 16/456,492

(22) Filed: Jun. 28, 2019

(65) Prior Publication Data
US 2020/0411813 A1    Dec. 31, 2020

(51) Int. Cl.
*H02J 7/00* (2006.01)
*H01M 50/209* (2021.01)

(52) U.S. Cl.
CPC ......... *H01M 50/209* (2021.01); *H02J 7/0045* (2013.01); *H02J 7/0047* (2013.01); *H02J 7/0049* (2020.01)

(58) Field of Classification Search
CPC ........................... H02J 7/0045; H01M 2/1066
USPC ................................................. 320/110, 107
See application file for complete search history.

(56) References Cited

U.S. PATENT DOCUMENTS

| | | | |
|---|---|---|---|
| 5,421,745 A | 6/1995 | Aksoy et al. | |
| 5,607,791 A | 3/1997 | Garcia et al. | |
| 5,770,330 A | 6/1998 | Castaneda et al. | |
| 5,910,380 A | 6/1999 | Taraboulos et al. | |
| 6,229,280 B1 * | 5/2001 | Sakoh ................ | G01R 31/3646 320/106 |
| 6,329,788 B1 * | 12/2001 | Bailey, Jr. ................. | B27B 9/02 320/114 |
| 7,381,086 B1 | 6/2008 | Gilmore et al. | |
| 7,714,538 B2 * | 5/2010 | Johnson .............. | H01M 2/1055 320/114 |
| 8,150,476 B2 | 4/2012 | Crawford et al. | |
| 9,991,619 B1 | 6/2018 | Kee et al. | |
| 2013/0106344 A1 * | 5/2013 | Amero, Jr. ........... | H01R 13/512 320/107 |
| 2013/0314880 A1 | 11/2013 | Sun et al. | |

OTHER PUBLICATIONS

Intellectual Property Office, Patents Act 1977: Search Report under Section 17, corresponding application No. GB2009629.3, dated Oct. 15, 2020, all pages.

* cited by examiner

*Primary Examiner* — Yalkew Fantu
(74) *Attorney, Agent, or Firm* — Timothy D. Casey

(57) ABSTRACT

A battery pack is provided with an improved charger interface through the use a contact carrier assembly. The non-conductive contact carrier aligns and retains a plurality of charger contacts. The carrier aligns a first portion of each charger contact along a back surface of the battery pack housing and further facilitates alignment of another portion of each charger contact within bottom apertures of the housing thereby allowing each contact to extend across perpendicular back and bottom surfaces of the housing with improved ruggedness. Improved sealing is also provided by sealing the back of the carrier.

13 Claims, 4 Drawing Sheets

BATTERY PACK WITH CHARGER INTERFACE

FIELD OF THE INVENTION

The present invention relates generally to a battery pack and more particularly to a battery pack with charger interface.

BACKGROUND OF THE INVENTION

Portable communication devices, such as those used in public safety operations, are often powered by a removable battery pack. Such battery packs require charging by a charging device, and thus include a set of charging contacts. Such charging contacts need to be able to handle high current flow from the charger. Additionally, the charging contacts of the battery pack are typically left exposed during normal operation of the portable communication device and thus may be subjected to water, extreme temperatures and drop conditions. Creating a battery pack with a robust, watertight, high current flow charging interface can prove challenging. Battery packs for submersible products must prevent water from entering the internal electronics and cells of the pack. Traditional approaches to the charger interface of a battery pack have utilized ultrasonic welding. However, ultrasonically welding packs have a risk of breaking during drop impact, and compromising the water seal integrity. There is a need for battery pack housing to have tooled contacts at the closed end of the housing which are supported on multiple surfaces.

Accordingly, there is a need for a robust battery pack with improved battery pack charger interface.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
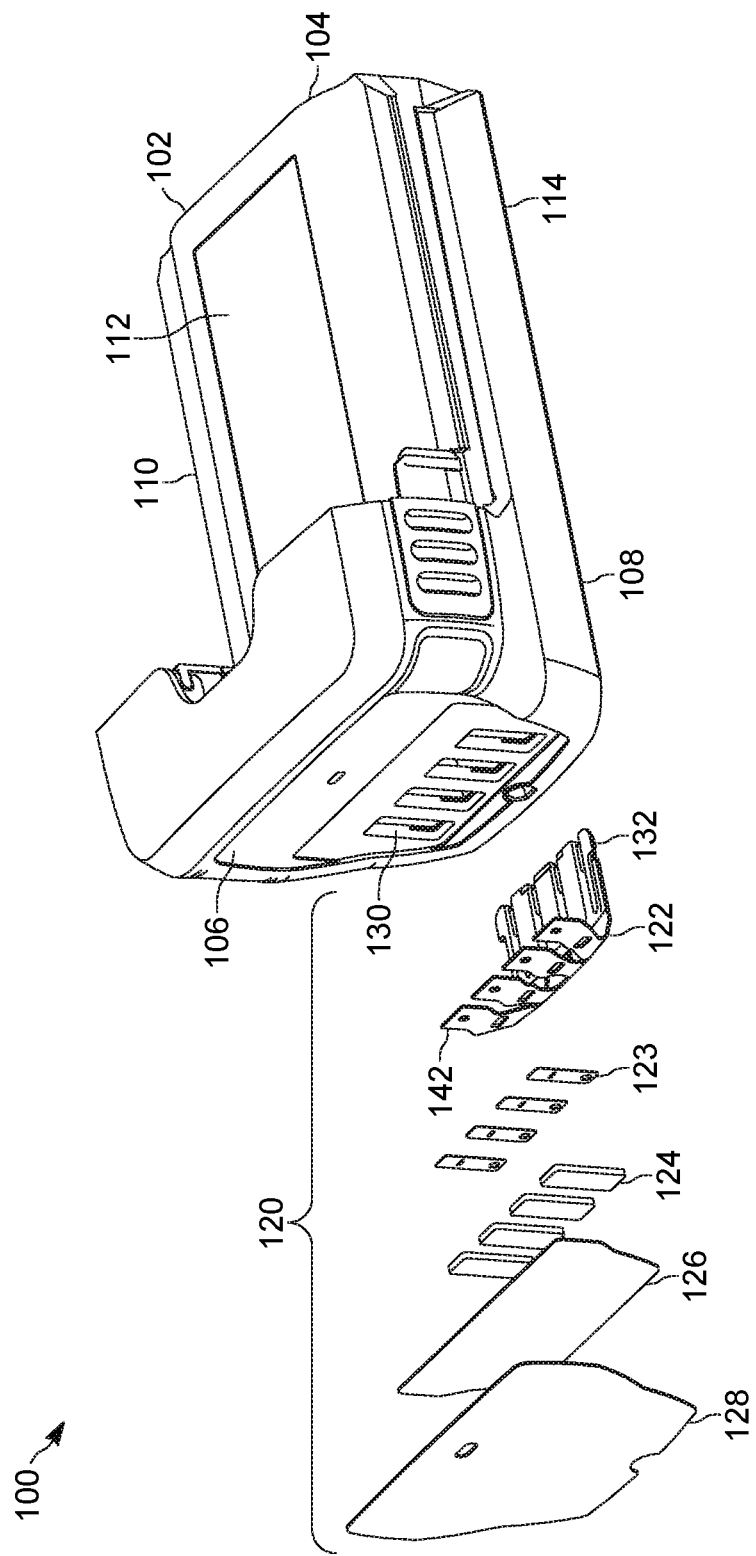
FIG. 1 is an exploded view of a battery pack with charger interface in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a battery pack having an improved charging interface. The battery pack housing comprises tooled contacts at a closed end of the housing which are supported on multiple surfaces. The battery pack is provided with an improved charger interface through the use of an improved contact carrier assembly. The non-conductive contact carrier aligns and retains a plurality of charger contacts. The carrier aligns a first portion of each charger contact within recessed openings along a back surface of the battery pack housing and further facilitates another portion of each charger contact within bottom apertures of the housing thereby allowing each contact to extend across perpendicular back and bottom surfaces of the housing with improved ruggedness. Improved sealing is also provided by sealing the back of the carrier.

FIG. 1 is an exploded view of an assembly for a battery pack 100 in accordance with some embodiments. Battery pack 100 comprises a battery pack housing 102, the housing being formed of a hard plastic and generally comprising a top surface 104, a bottom surface 106, a first side surface 108, a second side surface 110, a front surface 112, and a back surface 114. The housing 102 is formed of a ruggedized plastic material, for encasing a cell pack therein. The battery pack 100 comprises a charger interface 120, the charger interface comprising a charger contact carrier assembly 122 comprising a plurality of insert molded plastic and metal charger contacts which are further insert molded into bottom apertures 130 of housing 102. The charger interface 120 further comprises a plurality of metal tabs 123, one for coupling to each of a plurality of charging contacts 142. The metals tabs 123 are preferably laser welded to the contacts 142. Other welding methods can be used, however laser welding provides the advantages of enabling many welds in a small space. The assembly further comprises a plurality of non-conductive plugs 124, one to cover each metal tab 123. The assembly further comprises a seal 126 and label 128 to cover a bottom portion of the contacts 142.

In accordance with some embodiments, the charger contact carrier assembly 122 is formed of a non-conductive contact carrier 132 having a geometry that accommodates and retains the plurality of charging contacts 142. The assembly of charger contacts will be described later but briefly, the non-conductive contact carrier 132 retains a portion of the charger contacts 142 along the back surface 114 of the battery pack housing and aligns another portion of the charger contacts within the bottom apertures 130 allowing the contact to extend across perpendicular back and bottom surfaces of the housing.

Figure 2:
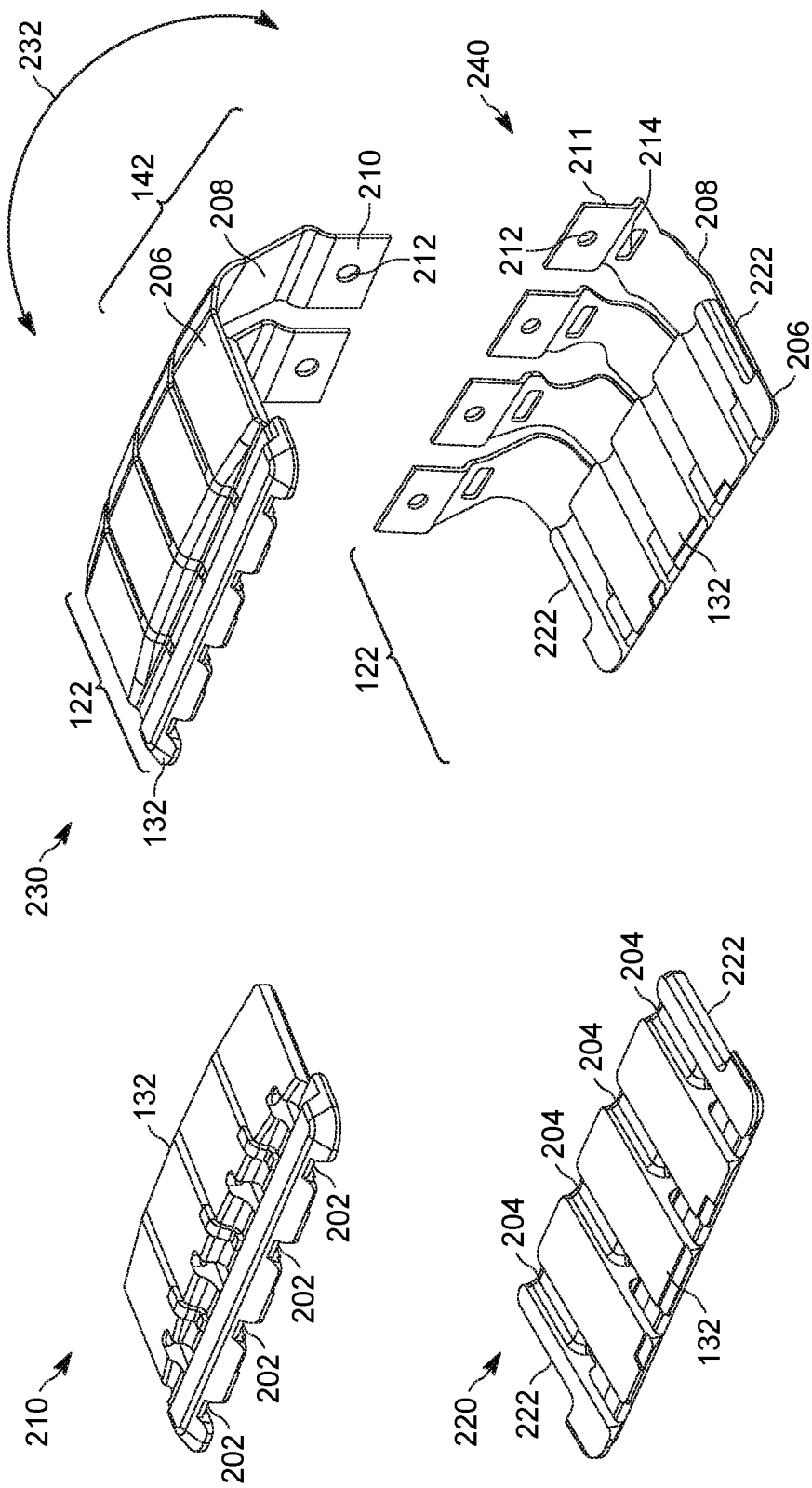
FIGS. 2A and 2B show the charger contacts and carrier assembly in accordance with some embodiments.

FIGS. 2A and 2B show the charger contacts and carrier assembly in accordance with some embodiments. FIGS. 2A and 2B respectively show the non-conductive carrier and the charger contact carrier assembly in accordance with some embodiments. FIG. 2A at view 210 shows a top surface of the non-conductive carrier 132 and view 220 shows a bottom surface of the non-conductive carrier 132. In accordance with some embodiments, the non-conductive carrier 132 comprises chamfered regions 202 which allow for downward force while also providing strength to withstand tooling shut-off during assembly. In accordance with some embodiments, the non-conductive carrier 132 further comprises flow channels 204. The flow channels 204 provide a path through which plastic of the battery housing plastic bonds forming a watertight seal. In accordance with some embodiments, the non-conductive carrier 132 further comprises a stepped region 216 which provides alignment for the carrier within the battery pack housing.

FIG. 2B at view 230 shows the charger contact carrier assembly 122 formed of non-conductive carrier 132 with contacts 142 assembled thereto in accordance with some embodiments. The contacts 142 comprise a planar portion 206 disposed on the top of the carrier and a leg portion 208 extending therefrom leading into a flat contact portion 211 having an alignment hole 212. The carrier 132 is curved so that the planar portions 206 of the contacts form a curved shape 232 of non-flat sheet metal contacts leading into flat alignment holes 212. The curved shape advantageously provides space savings. The charger contacts are formed via a sheet metal insert mold and are overmolded with a polymer to create the charger contact assembly 122.

View 230 shows non-conductive carrier 132 further comprises undercut portions 222. The undercut portions 222 are located on both sides of the carrier 132 to prevent the carrier contact assembly from pushing into the cell cavity during drop. Alignment hole 212 is provided within each contact 142 to facilitate assembly of each metal tab 123 to the flat portion 211 of each contact and to the recessed apertures 130 of housing 102 of FIG. 1. Slot 214 allows for the carrier contact assembly to be placed using less support, which enables greater sealing by eliminating the use of additional apertures in the bottom of the housing.

Figure 3:
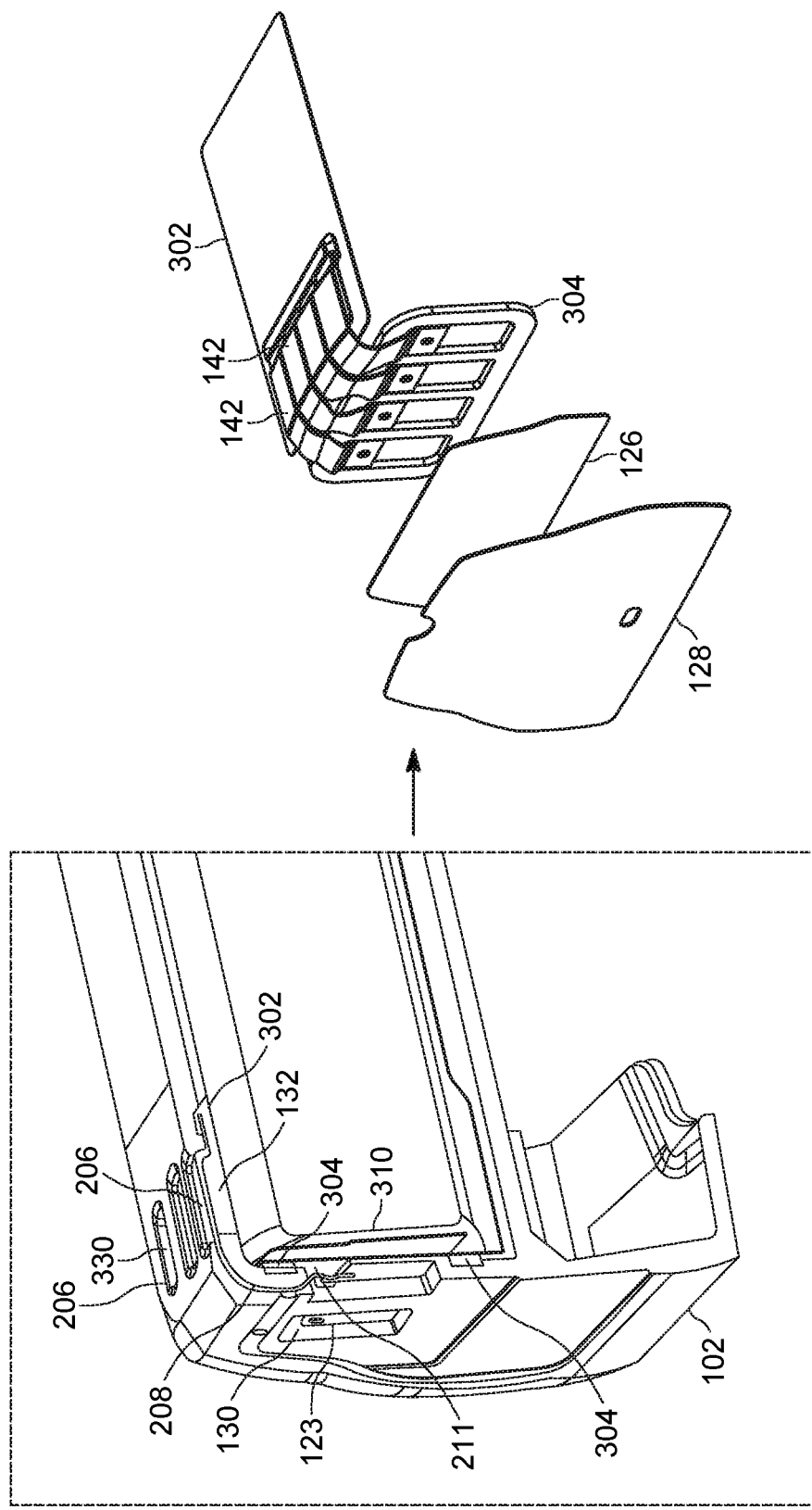
FIG. 3 shows a partial cross sectional views of the battery pack formed in accordance with some embodiments.

FIG. 3 shows a partial cross sectional views of the battery pack 100 formed in accordance with some embodiments. The battery pack housing advantageously comprises tooled contacts at a closed end of the housing which are supported on multiple surfaces. This view shows the flat contact portion 211 of each contact 142 attached, preferable by laser welding to the metal tab 123 within each bottom aperture 130. This view shows the leg portion 208 of each contact 142 extending from the planar portion 206 from the back surface of the battery pack housing into the bottom apertures 130 of the bottom surface of the battery pack housing. This view shows a first seal 302 shaped with a geometry the same as the carrier 132 and assembled to the carrier 132. The first seal 302 may be used, but is not required, to provide additional watertight sealing behind the non-conductive carrier 132 within the battery pack housing. A second seal 304 is located between a bottom end of cell pack 310 and the plurality of bottom apertures 130 containing the metal tabs 123 and flat contact portion 211. The second seal 304 is formed as a frame of parallel windows to compartmentalize each of the metal tabs 123, each metal tab being coupled to the flat portion contact 211. Hence, first, second interior seals 302, 304 have been provided along with a third exterior seal 126 (also shown in FIG. 4).

Figure 4:
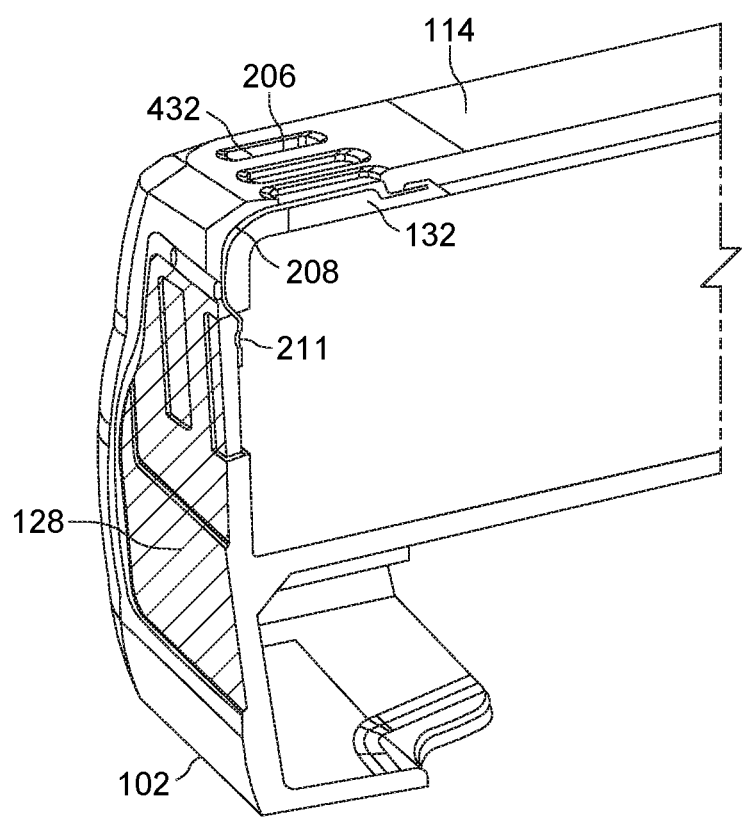
FIG. 4 show a partial cross section view of the assembled battery pack in accordance with some embodiments.

FIG. 4 shows another partial cross section view of the assembled battery pack in accordance with some embodiments. In this view label 128 is shown adhesively coupled (via seal 126 not shown) to the bottom surface of the housing 102 covering the plugged bottom apertures 130 containing the metal tabs 123 and contact portion 211 seen in FIG. 1 and FIG. 3. A plurality of recessed openings 432 are located on the back surface 114 of the battery pack housing within which the planar portion 206 of each contact 142 is located and exposed for charging purposes to mate with a charger.

Hence, first, second interior seals have been provided along with a third exterior seal.

Accordingly, there has been provided a battery pack housing with tooled contacts at a closed end of the battery pack housing which are supported on multiple surfaces. The battery pack with charging interface provided by the various embodiments provides for a compact, robust, watertight assembly that can withstand the harsh operating conditions encountered during public safety operations such as water, extreme temperature, and drop conditions. The high current flow charging interface provides a size efficient assembly, achieved without the use of ultrasonic welding.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery pack, comprising:
  a battery pack housing having top, bottom, first side, second side, front, and back surfaces;
  a plurality of contacts, each contact having a planar portion and a leg portion extending therefrom;
  a plurality of recessed openings located on the back surface of the battery pack housing;
  a plurality of recessed apertures located on the bottom surface of the battery pack housing;
  a non-conductive contact carrier located beneath the plurality of recessed openings of the back surface of the battery pack housing, the non-conductive contact carrier having a geometry that accommodates and retains the planar portion of each of the plurality of contacts to provide charger contacts along the back surface of the battery pack housing, and wherein each leg portion of the plurality of contacts extends from the back surface of the battery pack housing into the recessed apertures of the bottom surface of the battery pack housing;
  a plurality of metal tabs, each metal tab being coupled to each leg portion within the recessed apertures;
  a plurality of plugs, each plug being inserted into each of the plurality of recessed apertures along the bottom surface of the battery pack housing; and
  a seal formed as a frame of parallel windows to compartmentalize each of the metal tabs.

2. The battery pack of claim 1, wherein the contact assembly are inserted into the battery pack housing from the top end of the housing.

3. The battery pack of claim 2, wherein each of the plurality of metal tabs is coupled to each leg portion of the plurality of contacts.

4. The battery pack of claim 1, wherein the non-conductive contact carrier comprises chamfered regions.

5. The battery pack of claim 1, wherein the non-conductive contact carrier comprises: flow channels.

6. The battery pack of claim 5, wherein the flow channels provide a path through which plastic of the battery housing plastic bonds forming a watertight seal.

7. The battery pack of claim 1, wherein the non-conductive carrier further comprises:
  a stepped region which provides alignment for the carrier within the battery pack housing.

8. The battery pack of claim 1, wherein the non-conductive contact carrier comprises undercut portions.

9. The battery pack of claim 1, further comprising:
  another seal covering the plurality of plugs, sealing off the bottom surface of the battery pack housing.

10. The battery pack of claim 9, further comprising:
  an additional seal shaped with a geometry the same as the carrier and assembled to the carrier, the additional seal forming a watertight seal behind the non-conductive contact carrier within the battery pack housing.

11. The battery pack of claim 1, further comprising:
  an additional wherein the additional seal is formed as a frame of parallel windows to compartmentalize each of the metal tabs and flat portion contact.

12. The battery pack of claim 1, wherein each contact of the plurality of contacts further comprises:
  an alignment hole.

13. The battery pack of claim 12, wherein the alignment hole facilitates assembly of each metal tab of the plurality of metal tabs to the flat portion of each contact and within the plurality of recessed apertures of the battery pack housing.

* * * * *